(12) United States Patent  
Roper et al.

(10) Patent No.: US 9,304,612 B2  
(45) Date of Patent: Apr. 5, 2016

(54) OFF-SCREEN INPUT CAPTURE FOR MOBILE DEVICE

(71) Applicant: Lenovo (Singapore) Pte. Ltd., Singapore (SG)

(72) Inventors: Matthew Price Roper, Raleigh, NC (US); Jian Li, Chapel Hill, NC (US); Scott Edwards Kelso, Cary, NC (US); Geoffrey Simon Bula, Apex, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 50 days.

(21) Appl. No.: 14/201,489

(22) Filed: Mar. 7, 2014

(65) Prior Publication Data

US 2015/0253877 A1  Sep. 10, 2015

(51) Int. Cl.  
*G06F 3/0354* (2013.01)  
*G06F 3/0484* (2013.01)

(52) U.S. Cl.  
CPC ........ *G06F 3/03545* (2013.01); *G06F 3/04842* (2013.01)

(58) Field of Classification Search  
CPC .............. G06F 3/03545; G06F 3/0484; G06F 3/04842; G06F 3/0488; G06F 3/04883  
USPC ......................................................... 345/179  
See application file for complete search history.

(56) References Cited

U.S. PATENT DOCUMENTS

| | | | | |
|---|---|---|---|---|
| 6,930,673 | B2* | 8/2005 | Kaye et al. ..................... | 345/173 |
| 7,013,046 | B2* | 3/2006 | Kawamura et al. ........... | 382/186 |
| 7,777,729 | B2* | 8/2010 | Clary ............................. | 345/173 |
| 8,077,163 | B2* | 12/2011 | Qi ................................. | 345/177 |
| 2002/0089553 | A1* | 7/2002 | Arruda .................. | G06F 1/1616 715/864 |
| 2003/0214490 | A1* | 11/2003 | Cool ............................. | 345/179 |
| 2010/0177063 | A1* | 7/2010 | Altman ................. | G06F 3/0483 345/179 |
| 2013/0205189 | A1* | 8/2013 | DiPierro et al. ............... | 715/224 |
| 2014/0218343 | A1* | 8/2014 | Hicks et al. ................... | 345/179 |
| 2014/0253463 | A1* | 9/2014 | Hicks ............................ | 345/173 |
| 2014/0253464 | A1* | 9/2014 | Hicks et al. ................... | 345/173 |
| 2014/0253520 | A1* | 9/2014 | Cueto et al. ................... | 345/179 |
| 2014/0253522 | A1* | 9/2014 | Cueto ............................ | 345/179 |
| 2015/0100876 | A1* | 4/2015 | Neugebauer et al. ......... | 715/233 |
| 2015/0116283 | A1* | 4/2015 | Black et al. ................... | 345/179 |

* cited by examiner

*Primary Examiner* — Tom Sheng  
(74) *Attorney, Agent, or Firm* — Schwegman Lundberg & Woessner, P.A.

(57) ABSTRACT

A method includes capturing stylus input via a background task running on a mobile device, wherein the stylus input is from user interactions with the stylus separate from the mobile device, suppressing display of stylus input on a display screen of the mobile device while capturing stylus input via the background task, and storing the stylus input on a computer readable storage device accessible by the mobile device.

19 Claims, 5 Drawing Sheets

OFF-SCREEN INPUT CAPTURE FOR MOBILE DEVICE

BACKGROUND

Note taking applications on mobile devices and touch screen displays generally capture a stylus input interacting with sensors on the touch screen. A note taking application is in focus on the display in order to receive and process the input. The predominant method of note taking on mobile devices is comprised of a two part system. On-screen stylus capture technology (electro-magnetic resonance and capacitive sensing) provide the input channel to the operating system's input system. A purpose-specific note taking application accepts the input events from the devices' operating system and processes them into a stroke-data format (typically a proprietary format) for editing, searching, text recognition, manipulation and future recall.

SUMMARY

A method includes capturing stylus input via a background task running on a mobile device, wherein the stylus input is from user interactions with the stylus separate from the mobile device, suppressing display of stylus input on a display screen of the mobile device while capturing stylus input via the background task, and storing the stylus input on a computer readable storage device accessible by the mobile device.

A machine readable storage device has instructions for execution by a processor of the machine to perform capturing stylus input via a background task running on a mobile device, wherein the stylus input is from user interactions with the stylus separate from the mobile device, suppressing display of stylus input on a display screen of the mobile device while capturing stylus input via the background task, and storing the stylus input on a computer readable storage device accessible by the mobile device.

A system includes a processor, a touchscreen display coupled to the processor, and a memory device coupled to the processor and having a program stored thereon for execution by the processor to capture stylus input via a background task running on the processor, wherein the stylus input is from user interactions with the stylus separate from the mobile device, suppress display of stylus input on the touchscreen display of the mobile device during capture of stylus input via the background task, and store the stylus input on a computer readable storage device accessible by the mobile device.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of hardware based storage devices, either local or networked. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system. The article "a" or "an" means "one or more" unless explicitly limited to a single one.

Off-screen note taking capture is performed while a user interacts with a device's main screen displaying a different output. The captured notes may be stored in files allowing the user to replay the notes through a selected third party note application. Files may include various data structures such as pages or blocks, which may be stored in various types of storage devices such as for example an in memory buffer or database. In one embodiment, Android Jellybean and Nexus 10 may be used as the software and hardware platforms.

Figure 1:
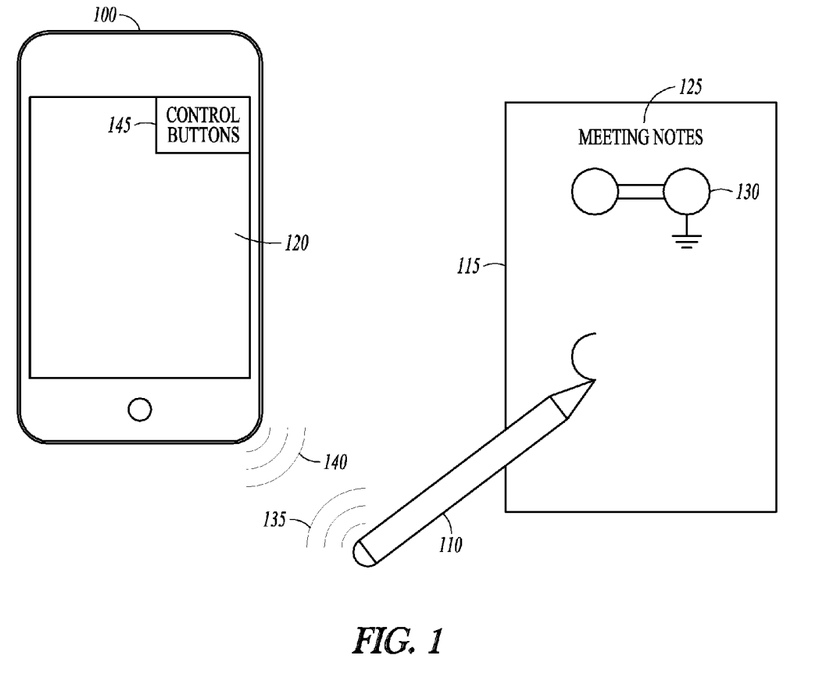
FIG. 1 is a block diagram illustration of a note taking system according to an example embodiment.

FIG. 1 is a block diagram illustration of a note taking system 100 according to an example embodiment. A mobile device 100 is coupled to receive stylus 110 input by user interaction with the stylus 110. In one embodiment, the user may use the stylus 110 on a surface 115 separate from a display 120 of the mobile device 100. Stylus input may be input generated from a pen, a finger, or other pointing device that is captured. In one embodiment, notes may include text 125 and drawings 130 that are taken by a user separate from a mobile device display. The notes may be captured while the user is engaging in other activities with the mobile device 100. The user may take notes without physical interaction (writing on screen 120) with the mobile device 100, allowing the mobile device display 120 to be used for other activities. In various embodiments, the notes may be taken with stylus 135 or other input device on a surface other than the display, such as a table top, notebook, or any other surface or medium, such as in the air, sufficient for off screen input capture.

The captured notes may be communicated via wired or wireless connections 135 and 140 between the stylus 110 and mobile device 100 in some embodiments and recorded as actual stylus movements by the user, or may be rendered into a format compatible with a particular note taking device and stored on a storage device integrated into the mobile device or other storage device. In further embodiments, the surface 115 may capture and transmit the notes. By capturing raw stylus data in a background of the mobile device 100, the touch screen 120 of the mobile device 100 may be used by the user to interact with a different application or mobile device function. The stylus data may be stored in memory on the mobile device 100, or in a networked based storage device.

The stylus input may be suppressed from being displayed on the display 120. The term 'suppression' is intended to mean that the stylus input is either not displayed at all during the note taking, displayed in an area outside of a foreground task display area, such as in a background task display area, or may even be displayed in a foreground task display area in a portion of the display area that does not significantly interfere with user interaction with the foreground task.

In a further embodiment, notes captured off-screen may be replayed into a note taking application of the user's choice. The captured notes may be captured in a format native to the operating system and played back via an operating system input system, such as HID input system on Windows or a motion event system on Android. Users may want to be able to view, edit, and save their notes into other formats in the future to be able to work with different applications. Playing back captured stylus movements into an application of choice allows the stylus movements to be rendered by a selected note taking application. Playing back at least partially rendered captured stylus movements into a native note taking application allows ease of editing in such note taking application without significant additional processing.

Capturing stylus 110 or pen strokes and motions outside of applications provides the opportunity to define a universal format to be used in storing this information. Universal formats open the ability for this stored information to be used in many other applications now and in the future. Consider the scenario of a new note taking application being released providing features that your previously favorite note taking application does not support. Having your previous notes stored in an application agnostic format will allow for simple import into this new note taking application. Since most of the applications today rely on a proprietary format, moving notes from one application to another is very difficult if even possible.

Given that off-screen note taking will free up the display 120 of the mobile device 100 used to capture notes, the user will be able to maximize the use of their device. Other activities can be pursued while taking notes such as video conferencing, web browsing, or watching a student lecture.

Another benefit of enabling off-screen note taking is being able to capture notes while the mobile device 100 is in a low power state. Most mobile devices enabled for note taking employ digitizers embedded into the device's display to capture pen strokes. In order to use these subsystems, the device must be fully powered up with the display on. In one embodiment, the off-screen solution only powers on the wireless/ultrasonic transceiver 140 and low level operating system facilities to capture note data.

With off-screen note taking, the interaction and user experience is fundamentally different. When the user is writing off screen with a wireless-enabled stylus, it is not necessary for the strokes to appear on screen since the strokes are being made in the air or on some other physical medium (a piece of paper, notebook etc). The strokes made off screen are captured for computational processing in the future (injecting into note taking applications). In one embodiment, once the user has finished taking notes, the set of strokes that make up the notes taken are then stored on the system in the form of input events created by the operating system. This set of events is all that is needed to re generate the input into note taking processing applications in the future. In some embodiments, the strokes may correspond to a bit map for applications such as Paint, while in other embodiments, the strokes may correspond to lines and polygons, such as for drawing applications, which may be included in the term note taking application. In still further embodiments, the strokes may be rendered into a proprietary format corresponding to a selected note taking application.

In some embodiments, the stylus may include an ultrasonic pen that may be used along with a sensor to measure distance to the pen using sound distance measurements. Many other types of input device may be used as a stylus in further embodiments.

Sometime following note taking, a user may want to recall the notes by processing them through a note taking application of their choice. Since the notes are stored in the operating systems motion or HID event format, it is possible to "replay" these events back through the OS input system in order to have a note taking application process them.

Normally operating systems handle the stylus inputs and feed the applications with self-defined type of events, such as MotionEvent on Android. It usually requires that the applications have a view or window on display and those events will be delivered to the applications through the system. However, in various embodiments, a background service (without a view/window) is used to monitor those events by modifying the system. The events can then be filtered/stored by the background service to suit its needs.

The consideration of the stored data format is to capture all the information of the platform input event, and to recreate the platform input event for later replay through the system. Since it relies on the platform input system for the replay, all the apps for the platform should not have any issue handling the events.

Normally the off-screen capture device (digitizer, ultrasonic) is configured/calibrated to have the capture area mapped to the display, so the input event Xs and Ys will be the same as on screen to the applications. However, there is information such as device ID, tool type, . . . , which can be utilized by the capture service to filter out other inputs, such as on-screen touch.

Normally, the operating systems have some system method for the software to simulate some hardware input events, such as key press, touch, pen input, etc. One way to replay the captured data would be a service to read the stored data and recreate the input events and send to the system as simulated hardware input events.

For off-screen capture mode, the on-screen stylus input and visual indication, pen cursor, will mess up the on-screen running applications, so the stylus input may be surpassed from going to the normal system view/window channel, and hide the on-screen stylus cursor. The end users may be provided a clear indication of the writing surface boundary and stylus movement (a fix sized paper . . . ), also a visual indicator may be provided (blinking LED, etc) for the ongoing capture to help users understand the surface 115 boundary.

The captured stylus data's coordinates are for the full screen. However, each application has its own unique display layout on the screen, and most likely the area for accepting system pen input will not be the whole screen, and the coordinates of that area is hard to figure out if not impossible. In one embodiment, the application's intended input area is provided and translated/scaled from the captured coordinates to the app display coordinates. In one embodiment, the replay may be integrated with the application itself, such that the application reads out the captured data and render the data onto its canvas directly.

In one embodiment, a user may drag down a status bar to expose control buttons 145. Control buttons 145 may be exposed in other ways, including a separate application running on the mobile device 100 in further embodiments. A user may press a "Start Capture" button to automatically start a new page for note taking. The control buttons may be hidden once a control is selected, and exposed again by dragging down the status bar. Notes are then written on the off screen surface 115. Meanwhile, the user may interact with functions appearing on the main screen 120, such as Browser, Email, etc. When a new page is desired, the user may drag the status bar and select a "New Page" button. Notes may then be taken on the new page using the off-screen writing surface 115. Once the user decides that no more note-taking is needed, the user may drag down the status bar to press a "Stop Capture" button.

To replay notes previously taken into a selected application, the user may User start a desired note application and proceed to a note view. Again using the status bar to expose functions related to off-screen note taking, several more functions may be selected, including a "Show Replay Files" function. A user interface with a list of all the files (1 file correspondents to 1 page) will be presented on screen 120. The user may then select a file to replay. This user interface will disappear and the note application will be on focus, and the stored notes will be replayed on the note application resulting in the notes appearing on the screen 120. In various embodiments, events may be batched to improve replay speed. For instance, ACTION_MOVE MotionEvents may be batched to one event before sending to the system. The coordinates of the MotionEvent are also translated from the screen coordinates to the targeted note application's on screen view coordinates. There may also be a modification on the Android framework to safeguard the impact of replaying the MotionEvents. The replayed MotionEvents will be sent to the view only if the targeted note app is on display.

Figure 2:
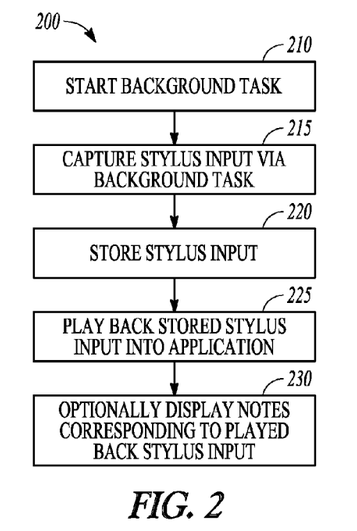
FIG. 2 is a flowchart illustrating a method of capturing stylus input according to an example embodiment.

FIG. 2 is a flowchart representation of a method 200 for off-screen note taking. At 210, a background task is started. The background task is used to capture stylus input at 215 representative of notes taken separate from the screen 120 of mobile device 100, such as by using stylus 110 with respect to a surface 115. At 220, the stylus input is stored on the mobile device 100, or in memory other accessible to mobile device 100. At 225, playback of the stored stylus input may be performed into a selected application. Events may be batched at 225. The application may be used at 230 to display the notes corresponding to the played back stylus input on screen 120 within the selected application.

Figure 3:
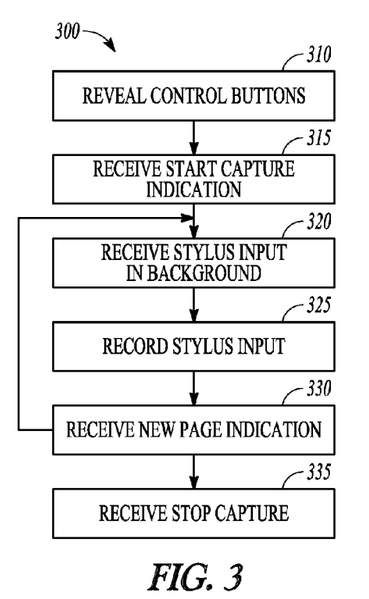
FIG. 3 is a flowchart illustrating a method of a user interacting with a stylus input background application according to an example embodiment.

FIG. 3 is a flowchart representation of a method 300 for interacting with a user utilizing off-screen note taking. At 310, control buttons for off-screen note taking control are revealed on the screen 120 of the mobile device 100. At 315, a start capture indication is received via the control buttons, and the control buttons may be hidden. The control buttons may be displayed at any time by the user dragging down a status bar, a combination of keys, or other means to obtain access to the functions. Stylus input is then received via a background task at 320 and it is recorded at 325. A new page indication may be received at 330 via the control buttons, allowing receipt of more stylus input at 320 and recording at 325. At 335, a stop capture command may be received via the control buttons, indicating note taking is finished. The control buttons may still be available for starting a new note taking session, or the background task may be ended.

Figure 4:
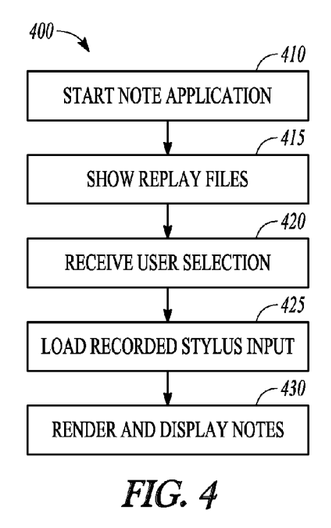
FIG. 4 is a flowchart illustrating a method of replaying captured stylus input according to an example embodiment.

FIG. 4 is a flowchart illustrating a method 400 of playing back recorded stylus input. At 410, the user may select a note taking application, and then select to show files available for replay at 415 via the control buttons of the background capture application. The user selection is received at 420, and recorded stylus input corresponding to the selection is loaded at 425. At 430, the stylus input is rendered and displayed to show the notes on the screen 120.

Figure 5:
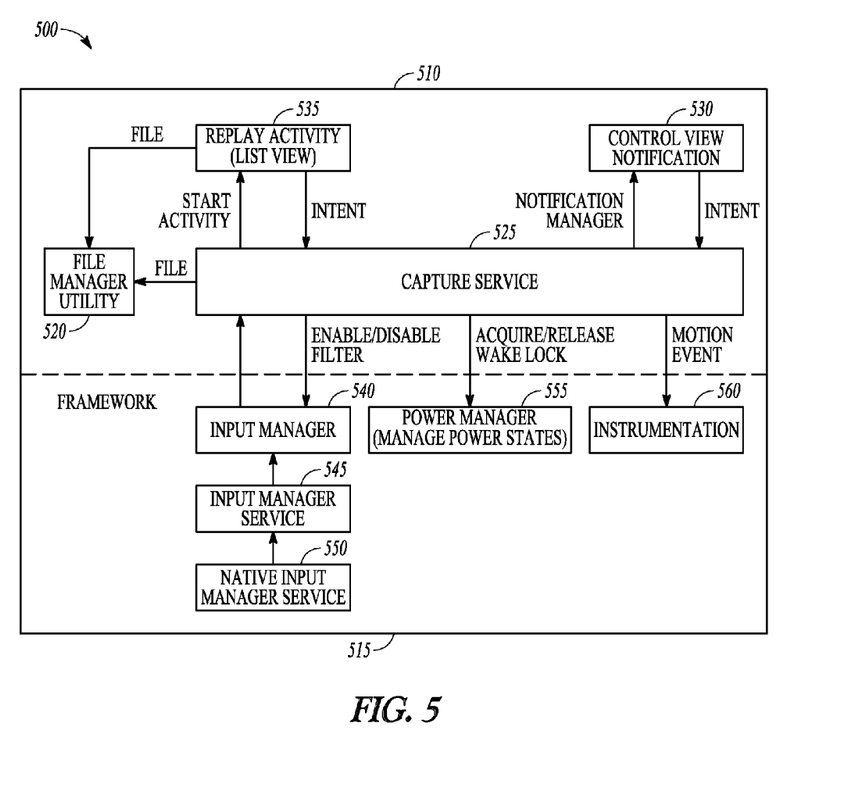
FIG. 5 is a block diagram illustrating a software architecture on a framework for a note taking system according to an example embodiment.

FIG. 5 is a block diagram 500 of an off screen capture software architecture 510 on a framework 515 according to an example embodiment. The software architecture 510 includes a file manager utility 520 that provides uniform access to ink files and their meta data to all other modules, rather than accessing a file system directly through Android application programming interfaces. The file manager utility 520 provides function to convert stroke data files into thumbnail images for display in one embodiment, and defines ink file object types, including file path, thumbnail images, etc.

A capture service 525 defines ink capture and playback systems. It manages the state of ink capture and the playback system, including states such as ready, capturing, and playing back. The capture service 525 manages underlying framework input capture system to switch from normal input operations to file capture only, such that stylus input during capture is sent to the file rather than to an entire system for display. In one embodiment, the capture service 525 is started at mobile device boot-up, and keeps running in the background. It hosts the state machine implementation and manipulates the inputs and controls other activities.

A control view 530, also referred to as a notification view, provides a visual state of capture service 525, allowing the user the ability to change the state of the capture system between start/stop playback, and start stop capture. A file list viewer 535 provides a view for browsing ink files for playback and deletion. The file list viewer 535 communicates with the capture service 525 to make requests for playback, and manages all the file creation and interface with the underlying file system.

In one embodiment, the control view 530 provides the list of functions in a pull down menu from the status bar to display the start capture, new page, stop capture, and show replay files buttons. Control view 530 may be implemented through notification, and may reside on the status bar in some embodiments.

The framework 515 is shown in simplified form to highlight the components that interact with the software architecture 510. Included are an input manager 540 with corresponding input manager service 545 and native input manager service 550. A power manager module 555 controls power states for the mobile device 100, and instrumentation module 560 provides support of devices coupled to mobile device 100.

Various modifications may be made to the underlying framework, which in one embodiment is an Android framework. The modifications are done to capture stylus input in the background and replay captures input is acceptable performance. In one embodiment, the capture service 525 uses a JavaScript Object notation (Json) to stream input data to and from files, so a Json library is also added to the framework. The input manager 540 may be modified to define an interface for capture service 525 to monitor inputs. The framework may be further modified to prevent stylus inputs from going to normal views when it is in off-screen capture mode. A system property to indicate the mode may be used in different embodiments. The screen cursor may also be hidden when in off-screen capture mode. In one embodiment, an asynchronous method for sending MotionEvents to the system may be used to speed up the playback process. The framework 515 may also be modified to only send the MotionEvents to views if a targeted application is on display.

Figure 6:
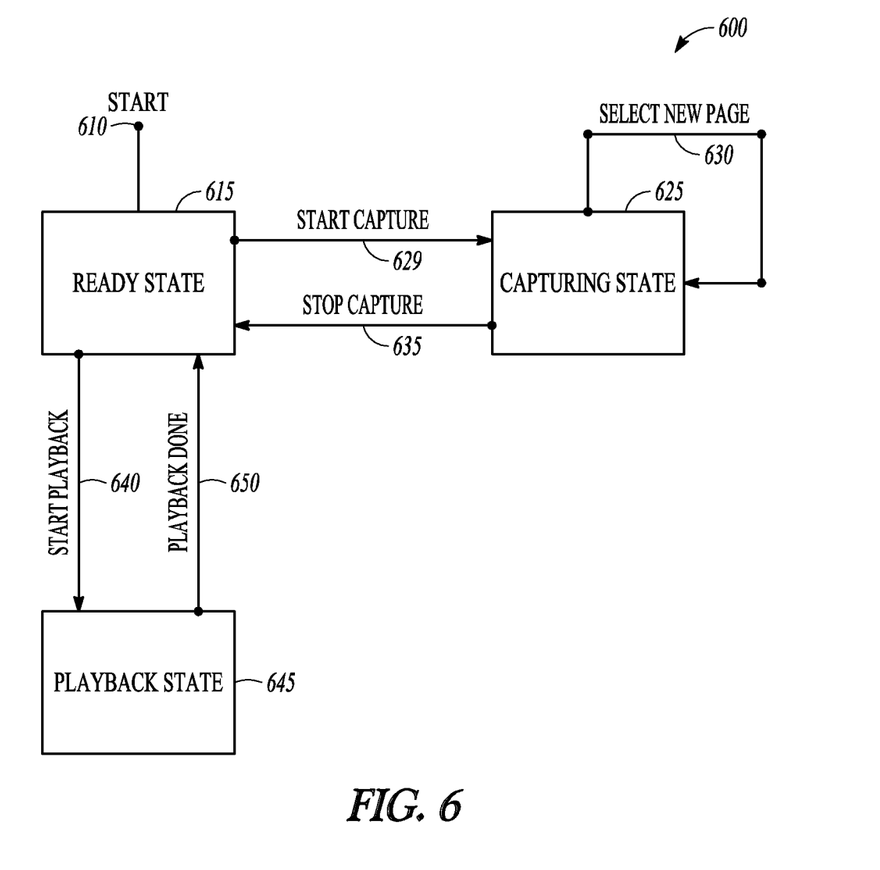
FIG. 6 is a block state diagram illustrating different states of a note taking system according to an example embodiment.

FIG. 6 is a block state diagram 600 illustrating the states of the off-screen note taking method. When the mobile device is turned on, or the off-screen note taking functions are otherwise initiated at starting point 610, a ready state is entered at 615. From ready state 615, the user may select start capture at 620, resulting in a capturing state being entered at 625. A user may select a new page at 630 from the capturing state 625. When done with note taking, the user indicates to stop capturing at 635, returning to the ready state 615.

From the read state 615, the user may select to playback a selected recorded note taking session at 640, causing the state to change to a play back state 645. When the playback is done at 650, the state returns to the ready state 615.

Figure 7:
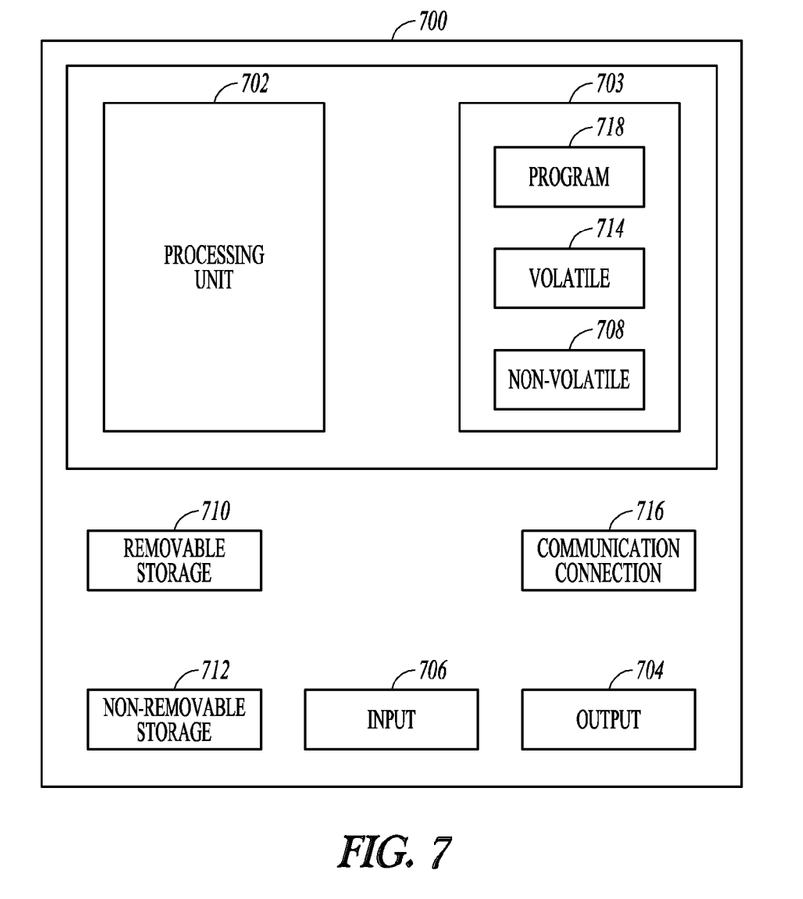
FIG. 7 is a block diagram of a computer system for implementing one or more devices and methods according to example embodiments.

FIG. 7 is a block schematic diagram of a computer system 700 to implement a controller according to an example embodiment. In one embodiment, multiple such computer systems are utilized in a distributed network to implement multiple components in a transaction based environment. System 700 may be a mobile device in one embodiment. One example computing device in the form of a computer 700, may include a processing unit 702, memory 703, removable storage 710, and non-removable storage 712. Memory 703 may include volatile memory 714 and non-volatile memory 708. Computer 700 may include—or have access to a computing environment that includes—a variety of computer-readable media, such as volatile memory 714 and non-volatile memory 708, removable storage 710 and non-removable storage 712. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 700 may include or have access to a computing environment that includes input 706, output 704, and a communication connection 716. The input 706 may include a touchscreen device for display and input. The computer may operate in a networked environment using the communication connection 716, such as Bluetooth, WiFi, or other wired and wireless device to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 702 of the computer 700. A hard drive, CD-ROM, and RAM are some examples of articles including a non-transitory computer-readable medium. For example, a computer program 718 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 700 to provide generic access controls in a COM based computer network system having multiple users and servers.

EXAMPLES

1. A method comprising:
   capturing stylus input via a background task running on a mobile device, wherein the stylus input is from user interactions with the stylus separate from the mobile device;
   suppressing display of stylus input on a display screen of the mobile device while capturing stylus input via the background task; and
   storing the stylus input on a computer readable storage device accessible by the mobile device.

2. The method of example 1 wherein the computer readable storage device is a storage device integrated with the mobile device.

3. The method of any of examples 1-2 and further comprising replaying the stored stylus input into a note taking application running on the mobile device.

4. The method of example 3 wherein replaying the stored stylus input comprises:
   displaying a list of files corresponding to stored stylus input;
   receiving a selection of a file; and
   replaying the file into the note taking application running on the mobile device to display notes corresponding to stored stylus input.

5. The method of example 4 wherein each file corresponds to a page, and the stylus input corresponds to notes taken on the page.

6. The method of any of examples 1-5 wherein the stylus input is stored in a format native to an operating system of the mobile device, and further comprising providing access to an application interface at the same time as stylus input is captured via the background task.

7. The method of any of examples 1-6 and further comprising partially rendering captured stylus input prior to storing the stylus input to facilitate editing of notes corresponding to the stylus input.

8. The method of any of examples 1-7 wherein the stylus input is stored in the form of input events.

9. The method of example 8 and further comprising batching multiple input events to one event.

10. The method of any of examples 1-9 and further comprising displaying selectable function buttons on the mobile device display to facilitate selection of capture and replay functions, wherein the function buttons are hidden following selection of a function.

11. A machine readable storage device having instructions for execution by a processor of the machine to perform:
   capturing stylus input via a background task running on a mobile device, wherein the stylus input is from user interactions with the stylus separate from the mobile device;
   suppressing display of stylus input on a display screen of the mobile device while capturing stylus input via the background task; and
   storing the stylus input on a computer readable storage device accessible by the mobile device.

12. The machine readable storage device of example 11 wherein the processor of the machine further performs replaying the stored stylus input into a note taking application running on the mobile device.

13. The machine readable storage device of example 12 wherein replaying the stored stylus input comprises:
 displaying a list of files corresponding to stored stylus input;
 receiving a selection of a file; and
 replaying the file into the note taking application running on the mobile device to display notes corresponding to stored stylus input.

14. The machine readable storage device of example 13 wherein each file corresponds to a page, and the stylus input corresponds to notes taken on the page.

15. The machine readable storage device of any of examples 11-14 wherein the stylus input is stored in a format native to an operating system of the mobile device, and further comprising providing access to an application interface at the same time as stylus input is captured via the background task.

16. A system comprising:
 a processor;
 a touchscreen display coupled to the processor;
 a memory device coupled to the processor and having a program stored thereon for execution by the processor to:
  capture stylus input via a background task running on the processor, wherein the stylus input is from user interactions with the stylus separate from the mobile device;
  suppress display of stylus input on the touchscreen display of the mobile device during capture of stylus input via the background task; and
  store the stylus input on a computer readable storage device accessible by the mobile device.

17. The system of example 16 wherein the processor further replays the stored stylus input into a note taking application running on the mobile device.

18. The system of example 17 wherein when the processor replays the stored stylus input, the processor:
 displays a list of files corresponding to stored stylus input;
 receives a selection of a file; and
 replays the file into the note taking application running on the mobile device to display notes corresponding to stored stylus input.

19. The system of example 18 wherein each file corresponds to a page, the stylus input corresponds to notes taken on the page, and wherein the stylus input is stored in a format native to an operating system of the mobile device, and further comprising providing access to an application interface at the same time as stylus input is captured via the background task.

20. The system of any of examples 16-19 wherein the stylus input is stored in the form of input events, and wherein multiple input events are batched into one event.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
 capturing stylus input via a background task performed by a first application running on a mobile device, wherein the stylus input is from user interactions with the stylus separate from the mobile device;
 suppressing display of stylus input on a display screen of the mobile device while capturing stylus input via the background task such that the display includes a view of a foreground task in a foreground task display area of the display and the background task is not displayed on the display, the foreground task performed by a second application, separate from the first application, running on the mobile device; and
 storing the stylus input on a computer readable storage device accessible by the mobile device.

2. The method of claim 1 and further comprising replaying the stored stylus input into a note taking application running on the mobile device in the foreground task display area over the display of the foreground task.

3. The method of claim 2 wherein replaying the stored stylus input comprises:
 displaying a list of files corresponding to stored stylus input in the foreground task display area;
 receiving a selection of a file; and
 replaying the file into the note taking application running on the mobile device to display the stylus input in the foreground task display area.

4. The method of claim 3 wherein each file corresponds to a page, and the stylus input corresponds to notes taken on the page.

5. The method of claim 1 wherein the stylus input is stored in a format native to an operating system of the mobile device, and further comprising providing access to an application interface for the second application that provides access to functionality of the foreground task at the same time as stylus input is captured via the background task.

6. The method of claim 1 and further comprising partially rendering captured stylus input prior to storing the stylus input to facilitate editing of notes corresponding to the stylus input.

7. The method of claim 1 wherein the stylus input is stored in the form of input events and wherein the first application powers on a stylus transceiver and operating system facilities on the mobile device such that the first application operates when the mobile device is in a low power state.

8. The method of claim 7 and further comprising batching multiple input events to one event.

9. The method of claim 1 and further comprising displaying selectable function buttons on the mobile device display over the display of the foreground task, the buttons to facilitate selection of capture and replay functions associated with operations of the background task, wherein the function buttons are hidden on the display following selection of a function button of the function buttons.

10. A machine readable storage device having instructions for execution by a processor of the machine to perform:
 capturing stylus input via a background task performed by a first application running on a mobile device, wherein the stylus input is from user interactions with the stylus separate from the mobile device;
 suppressing display of stylus input on a display screen of the mobile device while capturing stylus input via the background task such that the display includes a view of a foreground task in a foreground task display area of the display and the background task is not displayed on the display, the foreground task performed by a second application, separate from the first application, running on the mobile device; and
 storing the stylus input on a computer readable storage device accessible by the mobile device.

11. The machine readable storage device of claim 10 wherein the instructions further perform replaying the stored stylus input into a note taking application running on the mobile device in the foreground task display area over the display of the foreground task.

12. The machine readable storage device of claim 11 wherein replaying the stored stylus input comprises:
    displaying a list of files corresponding to stored stylus input in the foreground task display area;
    receiving a selection of a file; and
    replaying the file into the note taking application running on the mobile device to display the stylus input in the foreground task display area.

13. The machine readable storage device of claim 12 wherein each file corresponds to a page, and the stylus input corresponds to notes taken on the page.

14. The machine readable storage device of claim 10 wherein the stylus input is stored in a format native to an operating system of the mobile device, and further comprising providing access to an application interface for the second application that provides access to functionality of the foreground task at the same time as stylus input is captured via the background task.

15. A mobile device comprising:
    a processor;
    a touchscreen display coupled to the processor;
    a memory device coupled to the processor and having a program stored thereon for execution by the processor to:
        capture stylus input via a background task performed by a first application running on a mobile device, wherein the stylus input is from user interactions with the stylus separate from the mobile device;
        suppress display of stylus input on a display screen of the mobile device while capturing stylus input via the background task such that the display includes a view of a foreground task in a foreground task display area of the display and the background task is not displayed on the display, the foreground task performed by a second application, separate from the first application, running on the mobile device; and
        store the stylus input on a computer readable storage device accessible by the mobile device.

16. The system of claim 15 wherein the memory device is integrated with the mobile device and the processor further replays the stored stylus input into a note taking application running on the mobile device in the foreground task display area over the display of the foreground task.

17. The system of claim 16 wherein when the processor replays the stored stylus input, the processor:
    displays a list of files corresponding to stored stylus input in the foreground task display area;
    receives a selection of a file; and
    replays the file into the note taking application running on the mobile device to display notes corresponding to stored stylus input in the foreground task display area.

18. The system of claim 17 wherein each file corresponds to a page, the stylus input corresponds to notes taken on the page, and wherein the stylus input is stored in a format native to an operating system of the mobile device, and further comprising providing access to an application interface for the second application that provides access to functionality of the foreground task at the same time as stylus input is captured via the background task.

19. The system of claim 15 wherein the stylus input is stored in the form of input events, and wherein multiple input events are batched into one event.

* * * * *